United States Patent [19]
Vockler

[11] 3,916,233
[45] Oct. 28, 1975

[54] ELECTRICAL MACHINE
[75] Inventor: Ulrich Vockler, Berlin, Germany
[73] Assignee: Licentia Patent-Verwaltungs-GmbH, Frankfurt, Germany
[22] Filed: June 4, 1974
[21] Appl. No.: 476,257

Related U.S. Application Data
[63] Continuation of Ser. No. 306,725, Nov. 15, 1972.

[30] Foreign Application Priority Data
Nov. 18, 1971 Germany.............................. 2158211

[52] U.S. Cl................................... 310/89; 310/91
[51] Int. Cl.² ......................................... H02K 5/00
[58] Field of Search .......... 310/195, 254, 258, 259, 310/216, 217, 218, 89, 90, 91, 66, 42; 248/16, 23

[56] References Cited
UNITED STATES PATENTS

| | | | |
|---|---|---|---|
| 2,320,843 | 6/1943 | Baudry | 310/258 |
| 2,554,226 | 5/1951 | Taylor | 310/258 |
| 3,237,035 | 2/1966 | Hoffmann | 310/258 |
| 3,375,382 | 3/1968 | Barber | 310/42 |
| 3,387,152 | 6/1968 | Mucke | 310/89 |
| 3,544,823 | 1/1970 | Chigirinsky | 310/91 |
| 3,683,221 | 8/1972 | Konovalov | 310/258 |
| 3,789,252 | 1/1974 | Abegg | 310/259 |

*Primary Examiner*—R. Skudy
*Attorney, Agent, or Firm*—Spencer & Kaye

[57] ABSTRACT

An electrical machine has a machine housing that includes two opposite end walls provided with aligned circular openings to which bearing plates are secured. Within the housing, at its bottom portion, there are affixed cradle-like stator supports, each including a curved, concave surface centered with respect to the circular openings. The stator core of the machine includes clamping end pieces affixed thereto. Each end piece has a curved, convex surface having a radius of curvature identical to that of the curved surface of each stator support. The stator core rests on the stator supports by virtue of the face-to-face conforming engagement between a curved surface on an end piece and a curved surface on a stator support. In this manner the rotor which is conventionally supported by bearings held by the bearing plates, is centered with respect to the stator.

8 Claims, 5 Drawing Figures

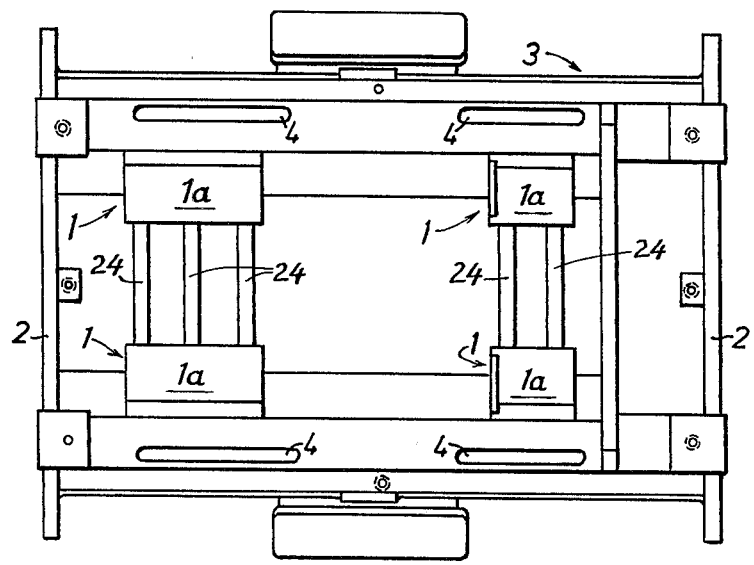
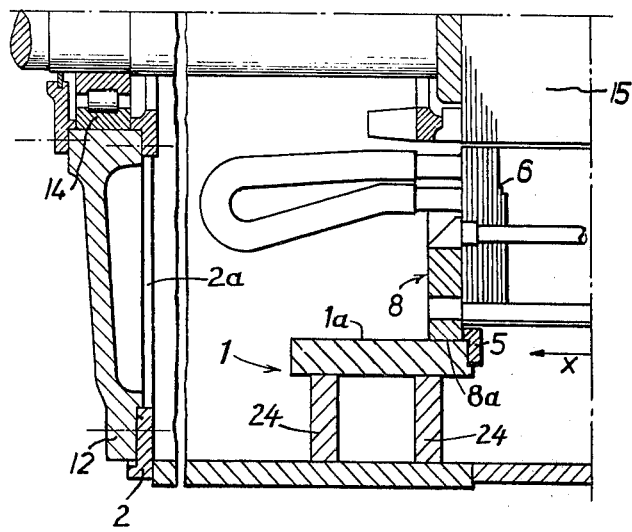
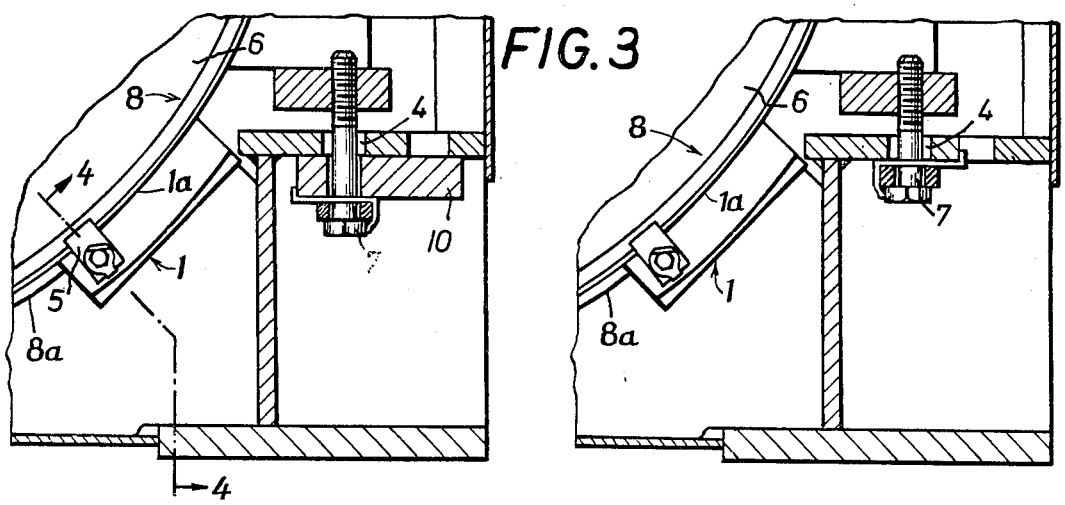

ELECTRICAL MACHINE

CROSS REFERENCE TO RELATED APPLICATION

This is a continuation of Application Ser. No. 306,725, filed November 15th, 1972, entitled ELECTRICAL MACHINE.

BACKGROUND OF THE INVENTION

This invention relates to a rotating electrical machine which has bearings disposed in bearing plates and a stator core which is inserted into the machine housing from the top. The bearing plates are inserted in aligned circular openings provided in opposite end walls forming part of the housing.

The purpose of such a type of machine construction is to accomplish the greatest possible economy in the manufacture. This means, however, that it should be possible to use one and the same housing even if, due to different electrical voltages, numbers of poles or lengths of the core iron, the axial length of the stator core varies. Further, in the manufacture of electrical machines of such general structure, difficulties are often encountered with regard to the centering of the stator core with respect to the rotor which, after having installed the stator core, is introduced into the machine housing in an axial direction and is rotatably supported by the bearings in the bearing plates.

SUMMARY OF THE INVENTION

It is an object of the present invention to provide a rotating electrical machine which permits safe and rapid centering of the rotor and the stator.

It is another object of the invention to provide an electrical machine of the rotating type which assures the possibility of using a standardized housing for stator cores of different lengths.

It is a further object of the invention to provide an electrical machine of the rotating type having active parts which may be rapidly installed and removed for replacement and repair.

The foregoing objects are achieved in accordance with the present invention by providing an electrical machine of the rotating type which includes a housing provided with oppositely disposed end walls each provided with a circular opening, bearing plates mounted in the openings and bearings disposed in the bearing plates. The stator core which is placed into the housing by lowering it through the housing from the top, has clamping end pieces each having an outer arcuate surface defining the outer diameter of the end piece. In the housing there are provided cradle-like stator supports which have an arcuate surface of the same curvature as that of the arcuate surface provided on the clamping end pieces. The curved surfaces of the cradle-like stator supports affixed to the housing are centered with respect to the circular openings in the end walls. The stator is supported in the housing by means of the face-to-face engagement between the curved surfaces of the clamping end pieces affixed to the stator core and the stator supports affixed to the housing. In this manner the stator core is centered with respect to the circular openings in the end walls. Consequently, the rotor which is axially inserted into the machine housing in a conventional manner and which is supported by the rotor bearings held in the bearing plates, is centered with respect to the stator. The axially measured length of the arcuate surfaces of the stator supports are so dimensioned that the axial length of the stator core (and thus the axial position of the clamping end pieces in the housing) may vary for one and the same housing. The concentricity between either circular opening in an end wall of the housing and the curved surfaces of the stator supports is expediently insured by machining the circular openings in the end walls and the curved surfaces of stator supports already affixed to the housing in the same machining operation. The arcuate faces of the clamping end pieces on the stator core are machined to the same diameter as the stator supports. On the sides next to the stator supports elongated slots are provided in the housing. The stator core may be affixed to the housing by tightening bolts that pass through the slots and engage directly or indirectly (for example, by plates) the stator core.

As it is well-known in dynamoelectric machines, the location of the circular opening in each end wall of the housing determines the position of each bearing plate (also termed as "end bracket"), the rotor shaft bearings and thus the rotor. Such an arrangement is generally shown in U.S. Pat. No. 2,795,713. Since, according to the invention, provisions are made to center the arcuate support faces of the stator supports with respect to the aligned circular openings in the end walls of the housing, it follows that the circular openings and the stator supports together form means to automatically center the stator and the rotor with respect to one another and thus the air gap is clearly defined. At the same time, the exclusive securing with the aid of the elongated slots makes it possible for stator cores having different lengths to be rapidly installed or removed.

For the suitable axial fixing of the stator cores which have different lengths due to different numbers of poles, voltages and core iron lengths, a preferred embodiment of the invention supplements the stator supports with spacers which are screwed to the stator supports and are so constructed with regard to the length of the stator core as to axially fix the stator core in place.

In order to further simplify installation or removal of a stator core into or out of the housing, respectively, the tightening bolts or screws and thus the elongated slots are accessible from the outside of the housing.

If the stator supports and the elongated slots are arranged next to one another in a plane perpendicular to the machine axis, that is, in such a manner that in the peripheral direction an elongated slot is followed by two stator supports to the left and right of the center vertical and then again by an elongated slot, a four-point contact is obtained which reduces the amplitudes of damaging vibrations of the stator core as compared to the usual two-point contacts.

BRIEF DESCRIPTION OF THE DRAWINGS

FIG. 2 is a top plan view of the housing.

FIG. 3 is a fragmentary, partially cross-sectional view of an electrical machine showing one of its stator supports as viewed in the direction of the arrow X shown in FIG. 4.

FIG. 4 is a fragmentary, axial, partially cross-sectional view of an electrical machine taken along line 4—4 of FIG. 3.

FIG. 5 is a view similar to that of FIG. 3, illustrating a modification of the screw connection.

DESCRIPTION OF THE PREFERRED EMBODIMENTS

Figure 1:
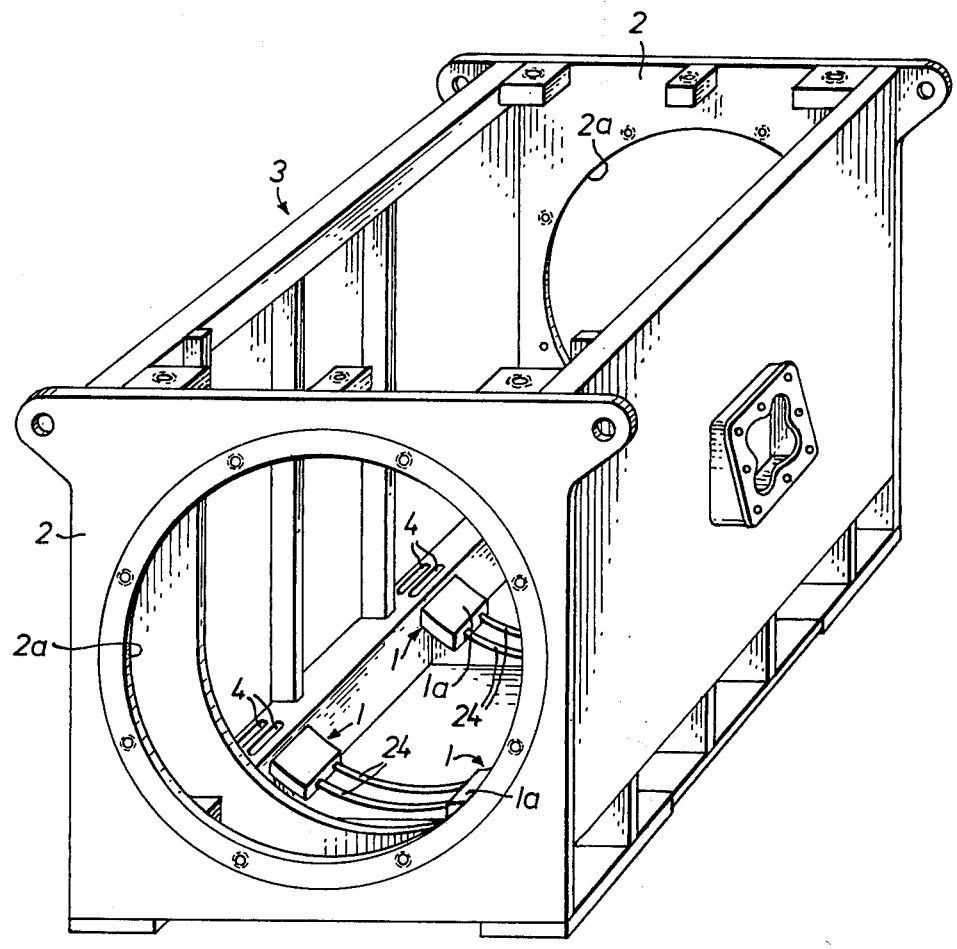
FIG. 1 is a perspective view of a conventional electrical machine housing including a stator support constructed according to the invention.

Turning now to FIGS. 1 and 2, there is illustrated an electric machine housing 3 which has two oppositely disposed end walls 2, each provided with circular openings 2a aligned with one another. The housing 3, which is to accommodate the stator and the rotor of the electrical machine is open at the top to permit the stator to be lowered into the housing from above when the housing 3 is in its upright position as illustrated in FIG. 1. At the bottom of the housing 3, affixed thereto, there are positioned stator supports (stator supporting blocks) 1 which are arranged in pairs held together by a connecting structure 24. FIG. 1 shows two such cradle-like support assemblies in an axially spaced relationship. Each stator support 1 has an upwardly oriented curved, concave surface 1a. All the curved surfaces 1a are centered with respect to the circular openings 2a. Such a concentricity may be expediently insured if the machining of the circular openings 2a and the surfaces 1a occurs during the same machining operation.

Turning now to FIGS. 3 and 4, there is illustrated, in a fragmentary manner, a stator core 6 which at each axial end is provided with a clamping end piece or end plate 8 (only one shown). The latter, as it may be observed particularly in FIG. 3, can be of ring-like configuration. The outer periphery of each end piece 8 is constituted by an arcuate (cylindrical) curved convex surface 8a which, as it is also well observable in FIG. 3, is of the same curvature as the surfaces 1a of the stator supports 1. Stated differently, the outer diameter of each end piece 8 (the outer diameter being defined by the surface 8a) is identical to the inner diameter of each stator support 1 (the inner diameter being defined by the surface 1a). The stator 6 thus rests with it entire weight on the stator supports 1 by means of a face-to-face engagement between each surface 8a of a clamping end piece 8 and the associated curved surface 1a of a stator support 1. In this manner the stator 6 is centered with respect to the aligned circular openings 2a.

As it is seen in FIG. 4, to the end wall 2 there is mounted, concentrically with the opening 2a, a bearing plate or end bracket 12 which at its hub accommodates a bearing 14. As it is well-known, both axial ends of the housing are provided with such a bearing plate 12. The bearing 14 rotatably supports the shaft of the rotor 15. It is to be noted that the rotor 15 may be inserted into the housing axially in a conventional manner after the stator core 6 has been lowered into position as described above.

As it will be apparent from an observation of for example FIGS. 2 and 4, the axial lengths of the curved surfaces 1a are such that the exact axial position of the clamping piece 8 on the surface 1a is not critical. Since the clamping end pieces 8 are situated at the axial ends of the stator core, the above-noted feature means that the stator supports are adapted to accommodate stator cores of different axial lengths.

Laterally adjacent each curved surface 1a of a stator support 1 there is provided in the housing 3 an elongated slot 4 oriented in the axial direction. Stated differently, the stator supports 1 and the elongated supports 4 are disposed one next to the other and are intersected by a plane perpendicular to the axis of the machine. These slots ensure that a reliable safe screw connection can be provided between the stator core structure 6 and the housing 3 while the length of the stator core is not fixed. The screw connection can be effected directly by passing screws 7 through the elongated slots 4 and tightening them into a threaded blind bore provided in a component of the stator core 6. It is expedient, however, to use insert plates 10 which are positioned, as illustrated in FIG. 3, below the elongated slots 4 and which support the head of the screws 7. By means of the plates 10 a more secure screw connection can be ensured for stators of different lengths, pole numbers and voltages.

As shown in FIGS. 3 and 4, a spacer 5 is screwed to the frontal side of the stator support 1. With such a spacer it is possible to axially fix any stator core 6, irrespective of its length, in the same housing 3, and thus in the same position of the stator supports 1. For this purpose the axial length of the spacer 5 must be selected with regard to the corresponding length of the stator core 6.

FIG. 3 shows that the stator core 6 is screwed to the housing 3 on its side by means of the tension screws 7 (only one shown) along the side adjacent the visible stator support 1. At least one such screw is adjacent each support 1. For the purpose of better accessibility to the tension screws 7, the wall of the housing 3 is offset toward the inside in the regions of the elongated slots 4 where the tension screws 7 pass through so that access to the longitudinal slots 4 and the screws 7 is provided from the outside and from the bottom.

While it is feasible to omit the insert plates 10 as illustrated in FIG. 5, their presence is advantageous, since they provide a greater support area for the heads of screws 7 than would, in some cases, the slotted housing component itself.

It will be understood that the above description of the present invention is susceptible to various modifications, changes and adaptations, and the same are intended to be comprehended within the meaning and range of equivalents of the appended claims.

I claim:

1. In an electrical machine having a housing including a removable cover at the top and radial end walls each provided with a respective central circular opening; a bearing plate mounted in each circular opening; a rotor shaft bearing supported in each bearing plate; a stator core clamped together by end plates, one disposed at each axial end of the core structure; the stator core forming, with the end plates, a self-contained unit disposed in the housing and dismountable as a whole; and a rotor relatively supported in the rotor shaft bearings; the improvement comprising:

a. a convex surface constituting the radially outer periphery of each said end plate, said convex surface defining the outer diameter of each end plate;
   b. a plurality of rigid stator supporting blocks positioned in a bottom zone of said housing and affixed thereto; each stator supporting block having a concave surface centered with respect to said circular openings in said end walls and defining the inner diameter of each stator supporting block; said inner diameter having a length identical to said outer diameter; the convex surfaces of said end plates being in a face-to-face conforming engagement with the concave surfaces of said stator supporting blocks for supporting the entire weight of said stator core; said circular openings and said convex and concave surfaces together define means for centering said rotor and said stator core with respect to one another;

c. a plurality of threaded bolt means situated in the vicinity of said supporting blocks for tightening said stator core to said housing.

2. An electrical machine as defined in claim 1, further comprising a plurality of spacers each screwed to a respective one of said stator supports for axially locating said stator core relative to said stator supporting blocks.

3. An electrical machine as defined in claim 2, said housing and said stator core have means each provided with a hole in the vicinity of said stator supporting blocks; the holes in the housing being in alignment with the holes in the stator core; said threaded bolt means passing through the aligned holes.

4. An electrical machine as defined in claim 3, wherein each bolt means has a substantially vertical orientation.

5. An electrical machine as defined in claim 4, wherein each said hole in said housing has an elongated shape extending parallel to the axis of the machine.

6. An electrical machine as defined in claim 5, further comprising plate means extending adjacent and beneath the elongated holes, and wherein said threaded bolt means connect said stator core to said housing via said plate means.

7. An electrical machine as defined in claim 5, wherein said stator supporting blocks and the elongated holes are disposed one next to the other in a plane perpendicular to the axis of the machine.

8. An electrical machine as defined in claim 5, wherein the elongated holes are accessible from the outside of said housing.

* * * * *